United States Patent [19]
Peretz

[11] Patent Number: 5,819,198
[45] Date of Patent: Oct. 6, 1998

[54] DYNAMICALLY PROGRAMMABLE AUTOMOTIVE-DRIVING MONITORING AND ALARMING DEVICE AND SYSTEM

[76] Inventor: Gilboa Peretz, 1814 NE. 185th St., Suite 203, North Miami Beach, Fla. 33179

[21] Appl. No.: 516,825

[22] Filed: Aug. 18, 1995

[51] Int. Cl.[6] .............................. B60Q 1/54; B60K 31/00
[52] U.S. Cl. .............................. 701/117; 701/119; 701/35; 340/905; 340/996
[58] Field of Search .................... 364/424.04, 426.04, 364/565, 436, 438; 340/441, 905, 438, 460, 936, 996; 180/167

[56] References Cited

U.S. PATENT DOCUMENTS

| | | | |
|---|---|---|---|
| 3,634,866 | 1/1972 | Meyer | 346/33 D |
| 3,656,099 | 4/1972 | Campbell | 340/901 |
| 3,680,043 | 7/1972 | Angeloni | 340/936 |
| 3,763,954 | 10/1973 | Permut et al. | 180/167 |
| 3,878,915 | 4/1975 | Purland et al. | 180/170 |
| 4,007,438 | 2/1977 | Protonantis | 340/466 |
| 4,229,727 | 10/1980 | Gilhooley | 340/905 |
| 4,314,232 | 2/1982 | Tsunoda | 340/460 |
| 4,459,668 | 7/1984 | Inoue et al. | 246/182 B |
| 4,591,823 | 5/1986 | Hornat | 340/936 |
| 4,843,578 | 6/1989 | Wade | 364/565 |
| 4,945,759 | 8/1990 | Krofchalk et al. | 340/439 |
| 5,289,183 | 2/1994 | Hassett et al. | 340/905 |
| 5,533,695 | 7/1996 | Heggestad et al. | 246/62 |

OTHER PUBLICATIONS

The Fleet Management Optimizer! P.G. Technologies, Inc. RoadMaster Junior; P.G. Technologies, Inc. ©1995.

*Primary Examiner*—Tan Q. Nguyen
*Attorney, Agent, or Firm*—Joseph Bach

[57] ABSTRACT

A device and system for monitoring speed limit violations of a driver is disclosed. The monitoring device according to the invention is installed in the vehicle and programmed to provide an alarm whenever a programmed speed limit has been exceeded. According to the disclosed system, legal speed limit, and other appropriate traffic signs are provided with transmitters which broadcast an encoded speed limit signal. The monitoring device is provided with a receiver which is capable of receiving the transmitted signal. Upon receiving the transmission, the monitoring device updates the programmed speed limit. The transmitted signal includes a system identification string to enable the monitoring device to validate the signal. In addition, the monitoring device validates the encoded speed limit. In the preferred embodiment a library of digitized voice messages provides warning appropriate to the driving condition and driving speed.

20 Claims, 6 Drawing Sheets

DYNAMICALLY PROGRAMMABLE AUTOMOTIVE-DRIVING MONITORING AND ALARMING DEVICE AND SYSTEM

BACKGROUND OF THE INVENTION

1. Field of the Invention

The present invention relates to automobile safety and driving education devices. More particularly, the present invention relates to such devices that monitor and alert the driver of excessive speed.

2. Description of Related Art

Several attempts have been made in the past to monitor the driving behavior of drivers of automobiles. Thus, for example, some car manufacturers have in the past color coded speed gauges of certain automobiles. According to such a scheme, speeds below the highway legal speed limit are colored one color, for example, green, while speeds above the maximum allowable speed limit are colored a different color, for example, red. Similarly, in the early Sixties Opel introduced a scheme wherein the speed dial itself changed colors depending on the driving speed. However, according to these schemes, the driver must take his eyes off the road to look at the dial in order to realize that he/she drives at excessive speed.

Another example is speed limiters, such as used by Volkswagen in early fuel-injected air-cooled engines designed to comply with the California emission restrictions. In such systems, a speed limit switch is turned off or on to designate excessive RPM to the fuel-injection microcomputer. The programmed "cut off" RPM is determined as that which would produce excessive emission and cause catastrophic heating of the exhaust system, but has no correlation to the legal speed limit. For example, in the Volkswagen models, the speed limit switch is set to turn off at about 5500 RPM.

However, a demand has arisen for devices that are more versatile, and which provide adequate warning to the driver of excessive speed. In addition, there is demand for a devices which would allow vehicle owners to monitor the driving behavior of their vehicles' operators, such as employees.

An attempt to answer this demand has been provided by a device called RoadMaster™ Junior, developed by the present inventor. This device allows the vehicle owner to manually input a maximum allowable speed of his choice. It also allows the owner to lock the input speed so that it cannot be changed. Thus programmed, the device would record the vehicle starting time, stop time, distance traveled, top speed, and duration of time the programmed speed has been surpassed. Therefore, the vehicle owner can monitor the driving behavior of a driver of the vehicle and identify violations of the preprogrammed speed limit.

In addition, during driving, whenever the input speed limit is exceeded, the device provides a visual and audible warning. This alerts the driver that he or she has exceeded the input speed limit without the need to check the speed dial. Therefore, safety is increased by encouraging the driver to drive below the input speed limit and allowing the driver to spend more time looking at the road rather than at the speed dial.

However, the above device has a drawback, in that only one speed limit can be input. Thus, the device is generally programmed by the owners to the legal highway speed limit. Consequentially, this device is ineffective insofar as lower speed limits, such as city speed limit, is being exceeded. Similarly, this device is ineffective for warning the driver of excessive speeds when approaching dangerous road conditions, such as a sharp curve or construction area.

SUMMARY OF THE INVENTION

In view of the above, the present invention is advantageous in that it provides a monitoring device which is capable of making a record of all legal speed limits violations.

The present invention is further advantageous in that it provides the driver with a warning of all legal speed limit violations.

Another advantage of the present invention is that it warns the driver of excessive speed with respect to approaching road conditions.

The above and other advantages are provided by the disclosed device which includes provisions for dynamically programming the speed limit according to the posted legal speed limit. According to the disclosed invention, legal speed limit signs are provided with transmitters. These transmitters continuously transmit the posted speed limit. These transmitters may also be provided on signs which warn of dangerous road conditions, such as a sharp curve, which necessitates lower speed than the posted legal speed limit.

A monitoring device is installed in the vehicle and programmed to provide an alarm whenever a defined speed limit has been exceeded. The monitoring device is provided with a receiver which is capable of receiving the transmission from the speed-limit sign transmitter. Upon receiving such a transmission, the monitoring device defines the speed limit as that which was received from the speed-limit sign transmitter. Accordingly, the speed limit of the monitoring device is dynamically programmed to be that of the posted legal speed limit.

BRIEF DESCRIPTION OF THE DRAWINGS

Other objects and advantages of the present invention will become apparent from the following description of the preferred embodiment with reference to the drawings, in which.

DETAILED DESCRIPTION OF THE PREFERRED EMBODIMENTS

Figure 1:
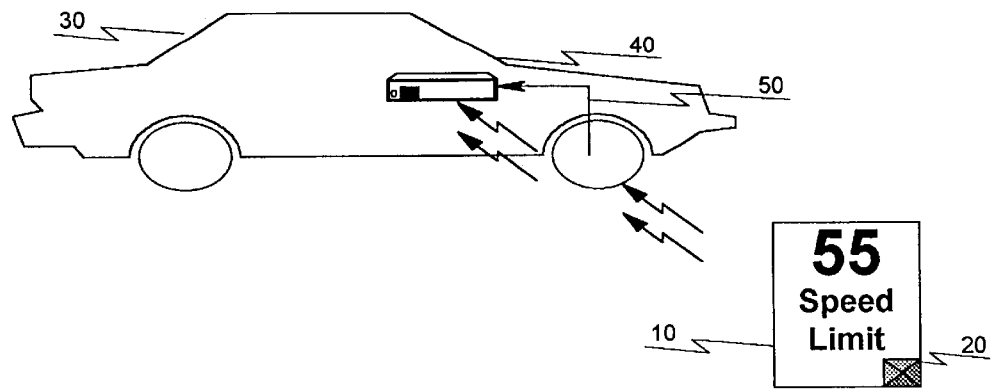
FIG. 1 is a schematic diagram of the system according to the present invention.

The system according to the present invention will be described with reference to FIG. 1. A road sign 10 is equipped with a transmitter 20 which is configured to continuously transmit a preprogrammed speed limit value ("SLV"). The road sign 10 could generally be, for example, a posted speed limit sign or other signs relating to driving or road conditions. In addition, the transmitter can be mounted on objects other than road signs. For example, it can be mounted of signal lights, school buildings, school busses, etc.

A vehicle 30 is equipped with a driver monitor 40 which receives the transmission from the transmitter 20. When the received SLV is different from the speed limit programmed in the driver monitor 40, the programmed speed limit will be updated. The driver monitor 40 also receives a vehicle speed signal 50 indicating the speed the vehicle 30 is traveling. When the speed from the speed signal 50 exceeds the speed limit programmed in the driver monitor 40, the driver monitor 40 audibly and/or visually alerts the driver and makes a record of the violation.

The visual alarm (not shown) can be a light emitting diode (LED) or the like. Also, a visual display (not shown) may be provided upon which an alarm can be displayed together with other pertinent information, such as the posted speed limit, hazardous condition, and the like. Moreover, during periods when no speed limit violation occurs, the display can be used to display useful information such as the date, time, outside temperature, etc. Off course, a combination of LED and a display can also be used.

The audio alarm (not shown) can be in the form of a simple "buzzer" or "chime." However, in the preferred embodiment the audio alarm consists of an audible message in the form of a digitized human voice. In addition, in the preferred embodiment the content of the audible message changes depending on the circumstances. Thus, for example, if the speed limit is exceeded by a marginal amount, the audible message can be programmed to: "speed limit is exceeded. Please slow down." However, if the speed limit has been exceeded by a dangerous amount, the audible message can be programmed to, for example, "speed is dangerously high."

Similarly, the audible message can be programmed to correlate to transmitter 20 from which the programmed speed limit has been received. This can be achieved by programming a library of messages which are triggered by an appropriate code or string included in the transmission. Thus, for example, if the transmission has been received from a school zone sign, the audible message may be programmed to: "school zone speed limit has been exceeded." Another example is when the speed limit has been reduced due to construction. In such zones the fine is normally above that for a speed limit violation on a highway. Therefore, the audible message can be programmed to reflect that fact, especially if the transmission includes data regarding the applicable fine. Thus, for example, the audible message can be programmed to: "speed exceeded for construction zone. Fine of [the fine amount corresponding to the coded transmission] is applicable."

The preferred embodiment of the system of the invention will now be described in more details. The transmitter 20 transmits an encoded signal which includes the SLV preceded by a system identifier string ("SIS"). In the preferred embodiment, the encoded signal is continuously transmitted at a frequency of 100 Hz; however, it would be appreciated by those skilled in the art that the signal can be transmitted intermittently or at other frequencies. For example, the transmission can be continuous during normal hours, but switched to intermittent or lower frequency during late at night when there is very low traffic. This can help save energy, especially is the transmitter is power by solar-backed batteries.

Figure 2:
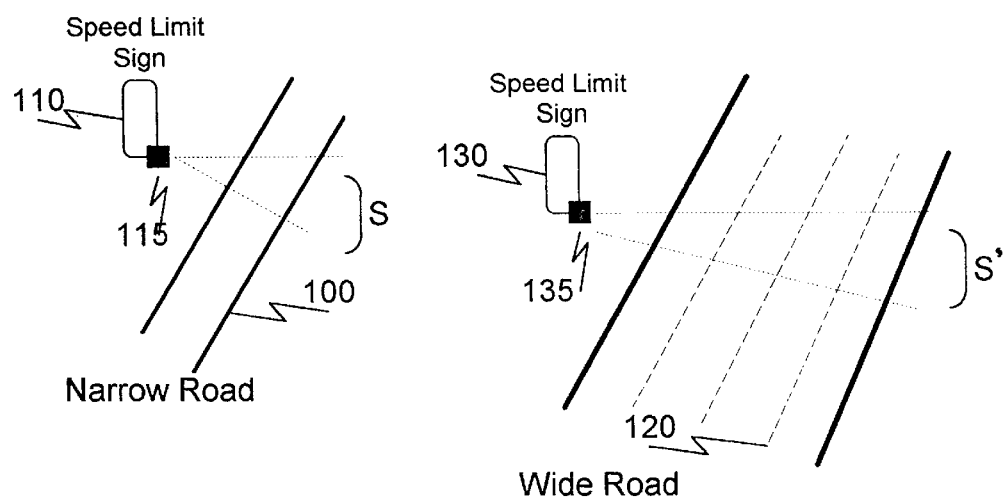
FIG. 2 is a schematic diagram exemplifying configurations of the transmitter of the system according to the invention.

With reference to FIG. 2, the strength and swath of the transmission can be varied depending on road and other conditions. For example, the sign 110, posted on a rural narrow road 100, may have a transmitter 115 of low power and relatively wide swath S. However, the sign 130, posted on a wide multi-lanes road 120 may have a transmitter 135 of relatively high power and narrow swath S'. The strength and swath of the transmission can also be varied to account for adjacent roads having different posted speed limits so as to avoid interference of various transmitters.

Figure 3:
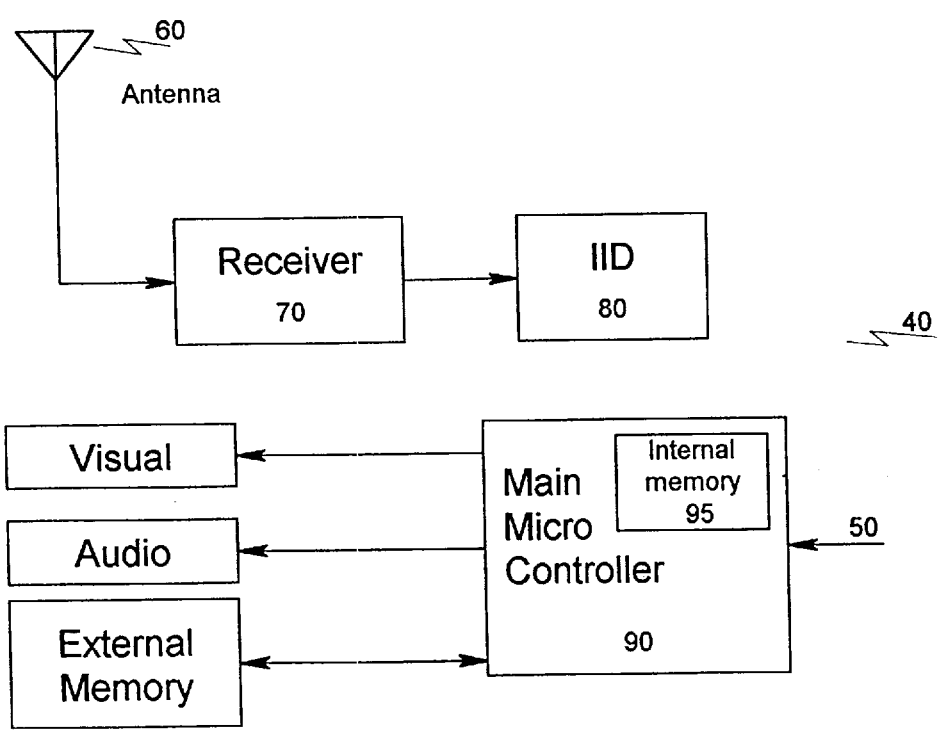
FIG. 3 is a block diagram showing the main parts of the driver monitor according to the preferred embodiment of the present invention.

The general structure of the driver monitor 40 is shown in FIG. 3. The coded signal is received by the receiver 70 through the antenna 60. It is then sent to the information interrupter device ("IID") 80. If it has been determined that the received signal is valid and that the speed indicated by the received signal differs from that programmed in the main micro-controller 90, the IID 80 sends the received speed signal to the main micro-controller 90 for an update.

The micro-controller 90 receives the vehicle speed signal 50 and continuously compares it to the programmed speed. When the vehicle speed signal 50 indicates a speed higher than the programmed speed, the main micro-controller 90 audibly and/or visually alarms the driver. In the preferred embodiment, the main micro-controller also stores in an internal memory 95 information indicating the speed violation. Such information can include the time the violation first occurred, the highest excessive speed reached, the duration of violation, etc. Another option, is to provide external memory, such as, for example, a memory card or a floppy disk, and save the information on the external memory.

Figure 4:
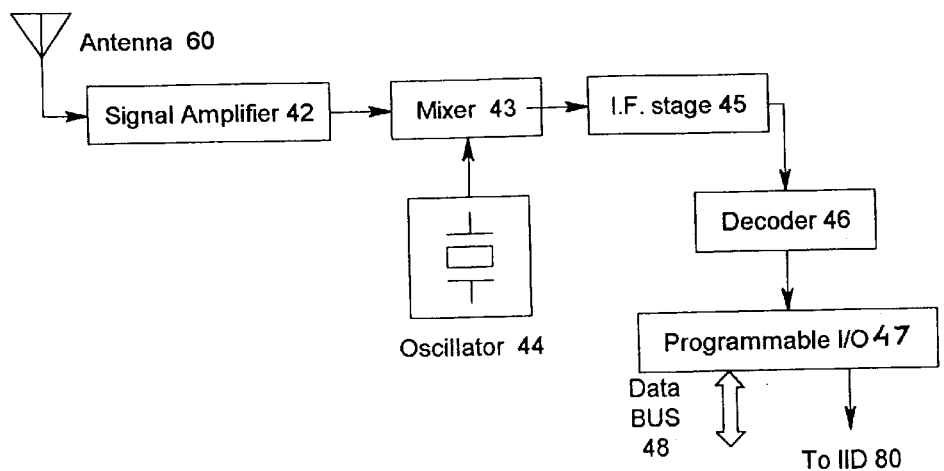
FIG. 4 is a schematic diagram showing the main components associated with the receiver section of the driver monitor of the preferred embodiment of the present the invention.

FIG. 4 illustrates the main components associated with the receiver 70. The transmitted signal is received by the antenna 60 and is then sent to the signal amplifier 42. The signal is amplified by the signal amplifier 42, and thereafter mixed in mixer 43 with a signal received from oscillator 44. The mixed signal is then passed through the intermediate frequency stage 45 and sent to the decoder 46 for decoding.

Figure 5:
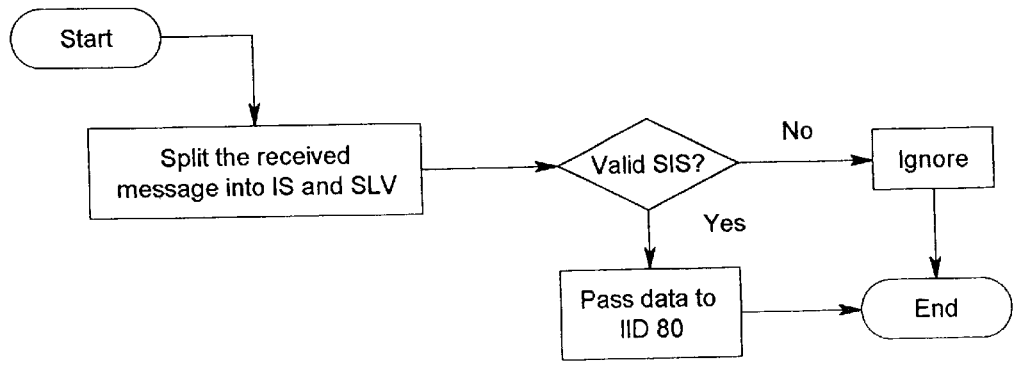
FIG. 5 is a flow chart of the programmable I/O device of the driver monitor of the preferred embodiment of the present the invention.

The decoded signal is then sent to the programmable I/O device 47, wherein it is split into its SIS and SLV parts. The SIS is analyzed to determine whether it is valid. If the SIS is invalid, the received decoded signal will be ignored. However, if the SIS is valid, the SLV will be permitted to pass to the IID 80. An exemplary flow chart of this process is depicted in FIG. 5.

Figure 6:
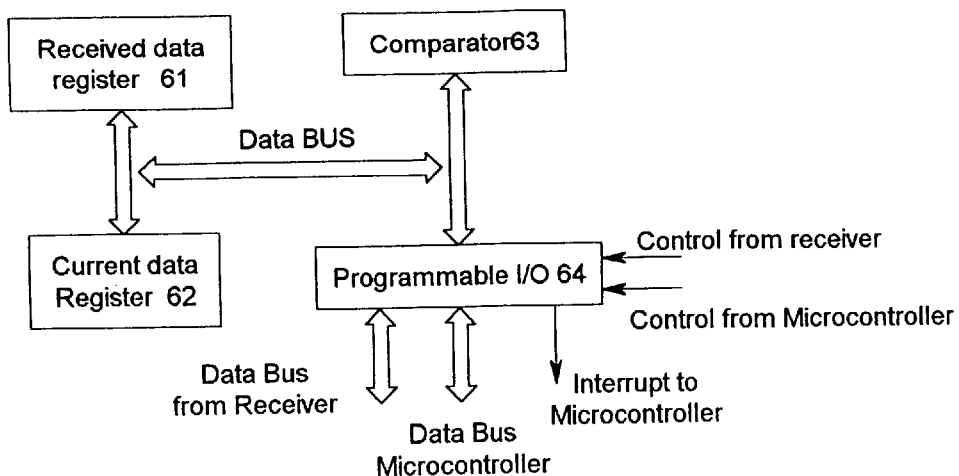
FIG. 6 is a schematic diagram showing the main parts associated with the information interrupter device of the driver monitor of the preferred embodiment of the present the invention.

The main components of the IID 80 are shown in FIG. 6. In the preferred embodiment the IID 80 is a state machine (a digital electronic circuit that relates system outputs to inputs with final number of states). However, it will be appreciated that other circuits, such as, for example, a CPU, may be used. The state machine of the preferred embodiment is implemented by a Gate Array/PLD (programmable logic device).

Figure 7:
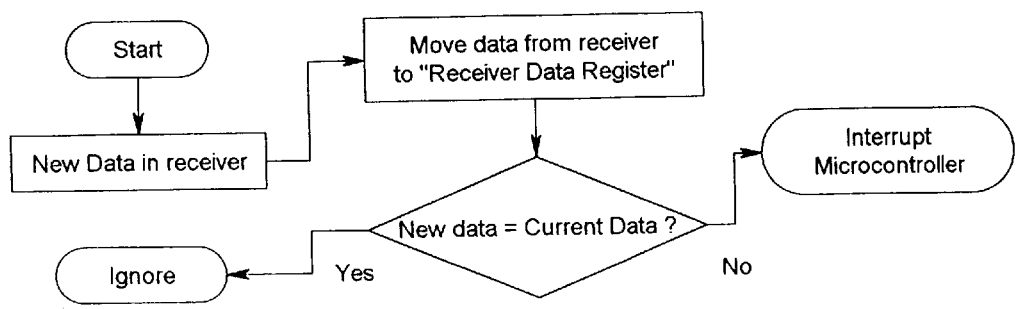
FIG. 7 is a flow chart illustrating the operation of the information interrupter device of the driver monitor of the preferred embodiment of the present the invention.

The currently programmed speed limit is stored in a current data register 62. The received SLV is stored in a received data register 61. The speeds stored in the received data register 61 and the current data register 62 are compared in the comparator 63. If the comparison revels that the speeds are different, the IID 80 will interrupt the main micro-controller 90 so that the currently programmed speed limit can be updated to the newly received speed limit. An exemplary flow chart for the above processing is depicted in FIG. 7.

It should be noted that the above described comparison can also be performed by the micro-controller 90. However, in the preferred embodiment the comparison is done at the IID 80 so that unnecessary interruptions of the main micro-controller 90 are avoided. This is especially important since, as was explained above, the transmitter 20 transmits the same SLV many time per second (100 Hz in the preferred embodiment). The amount of processing associated with the large number of incoming SLV's could overwhelm the main micro-controller 90. To relieve the main micro-controller 90 from this processing, the comparison is performed at the IID 80 stage.

Another option is skip the comparison altogether, and simply replace the programmed speed each time a valid SLV is received. However, this will also lead to unnecessary interruptions since according to this alternative the programmed speed limit will be updated even is it is identical to the received SLV. Such needless updating would be performed many times during the period the vehicle 30 is traveled within the beam of the transmitter 20.

Figure 8:
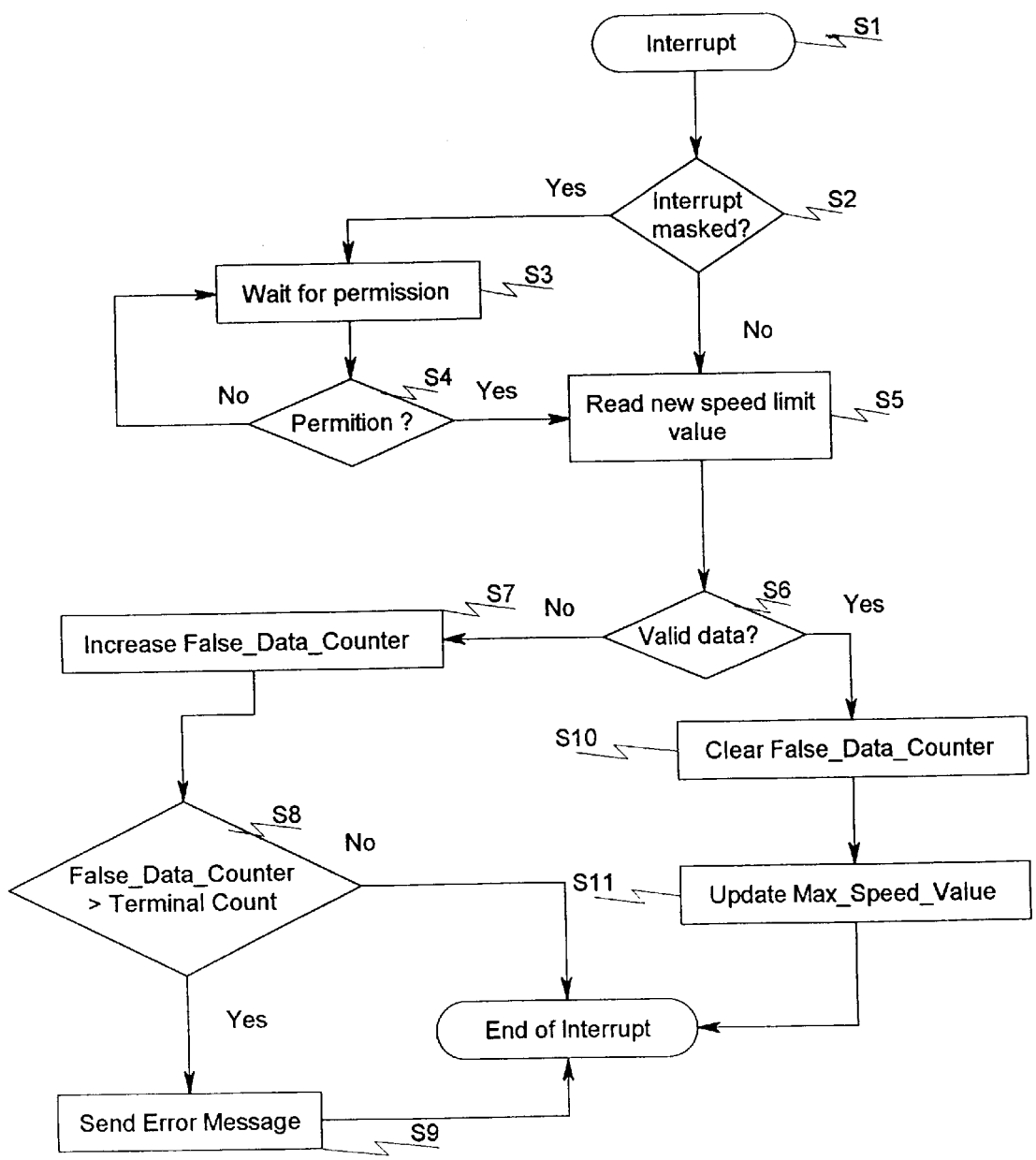
FIG. 8 is a flow chart illustrating the operation of the main micro-controller of the driver monitor of the preferred embodiment of the present the invention.

The main micro-controller 90 manages all operations of the driver monitor 40. In the preferred embodiment, when the main micro-controller 90 receives an interrupt from the IID 80 it execute the process shown in the exemplary flow chart of FIG. 8.

In step S1 the Interrupt line is pulled, and in step S2 it is checked whether if the micro-controller is busy with another interrupt of equal or higher priority. If the micro-controller is busy with another interrupt of equal or higher priority, the interrupt from the State Machine is masked. In this scenario the processing proceeds to step S3 and the Interrupt is queued and waits for the micro-controller to become available (S4).

On the other hand, if in step S2 the micro-controller was not busy with another interrupt of equal or higher priority, or if permission to continue was granted in step S4, processing of the interrupt is commenced in step S5 by reading the SLV from the IID 80. The read SLV is held in a temporary variable register (not shown).

In step S6 the SLV value is checked to determine whether it is valid data. For example, a check can be made to determine whether the SLV designates an unacceptable value. Such an unacceptable value can be, for example, any value higher than the highest posted speed limit. Currently in the United States, any SLV above 65 mph should be recognized as invalid.

If in step S6 it was determined that the SLV data is not valid, the micro-controller will increase the $False_{13}$ $Data_{13}$ Counter value by one in step S7. The False_Data_Counter stores the number of consecutive data strings that the system has determined to be invalid. In step S8 the value held in the False_Data_Counter is compared to a predetermined terminal count value. If in step S8 the False_Data_Counter is greater than the terminal count value, an error message will be generated in step S9. The error message indicates that the driver controller 40 malfunctions since it does not seem to receive and decode a valid SLV. Therefore, the speed limit needs to be reset manually. Upon issuing the error message, the False_Data_Counter will automatically reset itself (not shown).

It should be noted that an invalid SLV can also result from a malfunction of a transmitter 20. Therefore, in the preferred embodiment, the terminal count value of the False_Data_Counter is set at a high enough value that the vehicle 30 will most likely pass more than one transmitter 20 before the terminal count value has been reached. Since it is unlikely that two transmitters 20 transmit invalid SLV, if the False_Data_Counter reaches this high terminal count it is more likely that the malfunction is in the driver monitor 40 than in any of the transmitters 20.

It will be understood that other methods to ensure that the error message is not generated due to a transmission from a single transmitter 20 can be devised. For example, reception can be blocked for a predetermined of time if the False_Data_Counter has reached an intermediate count value. If the False_Data_Counter reaches the terminal count value after the resumption of reception, it will be more likely that it is due to a malfunction in the driver monitor 40.

Once the data coming from the IID 80 has been validated in step S6, the False_Data_Counter is reset in step S10. This ensures that the False_Data_Counter stores the number of consecutive invalid data strings rather than the total number of invalid data strings. Then, in step S11 the register that holds the maximum allowable speed limit (Max_Speed_Value) is updated to the new SLV value.

According to the above described driver monitor 40 and system of the invention, a driver can be audibly and/or visually alerted to any speed limit violation. In addition, the driver can be alerted to hazardous conditions which require reduced speed. Moreover, a record is made of all violations for monitoring purposes. Reading of the record can be made by connection to a computer (not shown). Such a connection can be made via cable or other conventional methods, such as radio or infra-red transmissions. In addition, the driver monitor 40 can be configured to accept external memory devices such as floppy disk or memory cards. The record can then be saved on the external memory device so that the external memory device can be read by a computer or other such processors.

In an alternative embodiment of the present invention, the driver monitor 40 is configured to provide audio and/or visual alarm whenever the currently programmed speed limit has been exceeded, as is done in the above-described embodiment. However, the driver monitor 40 of this alternative embodiment is programmed to make a record of the speed limit violation only if the vehicle speed 50 exceeds the programmed speed limit by a preprogrammed difference amount, for example 5 mph. Moreover, the difference amount can be variable depending on the currently programmed speed limit. For example, in city limits the difference can be set to be low, such as 3–5 mph, while on highway the difference can be set higher, such as 7–10 mph. Another approach would be to set the difference as a percentage of the currently programmed speed limit.

According to this alternative embodiment the size of the record will be reduced by avoiding making a record of minor speed violations, while still timely alerting the driver of such violations. Off course, by setting the preprogrammed difference amount to zero, the driver monitor 40 of this alternative embodiment will behave the same as the driver monitor 40 of the previous embodiment.

In the preferred embodiment, the micro-controller 90 is equipped with a continuous diagnostic utility to detect any errors with the system (not shown). The error messages are retained in internal memory 95 and made available to a technician at the time of repair.

In the preferred embodiment described above, the transmitter and receiver use electromagnetic (radio) waves to form the communication link. However, those skilled in the art may readily understand that the invention described and claimed can be implemented with other methods of communication. For example, an infra-red or laser beam links can be used. The infra-red link can be implemented in a similar manner as a remote control of a television set, wherein the transmitter is located on the road sign post and the receiver in the vehicle. An infra-red or laser link can also be implemented in a similar manner as the Universal Product Code ("UPC," commonly known as bar code) scanners used in grocery stores, wherein the bar code is located on the road sign post and both the transmitter and receiver are located in the vehicle.

Figure 9:
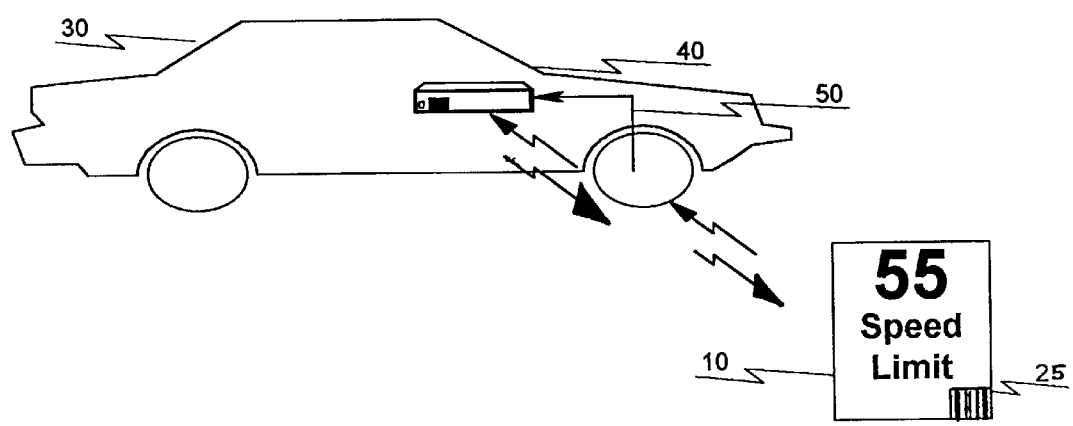
FIG.9 is a schematic diagram in which the transmitter of the road sign is replaced with a bar code.

In the later "bar code" method described, an example of which is shown in FIG. 9, the driver monitor 40 includes an infra-red or a laser transmitter which transmits an infra-red/laser signal. The transmitter 20 of the road sign 10 is replaced with a bar code 25. When the transmitted infra-red/laser signal hits the bar code 25, it is reflected and in the process "coded" with the information of the bar code 25. This reflected signal is received by the driver monitor 40. The decoding of this signal can be done by any conventional method known in the art.

While the present invention has been described with reference to exemplary preferred embodiments thereof, it should be apparent that numerous modifications can be made thereto by those skilled in the art without departing from the basic concept and scope of the invention. Any such modifications should be deemed within the scope and spirit of the appended claims.

What is claimed is:

1. A vehicle driver monitor device receiving a vehicle driving speed signal, comprising:

a receiver for receiving a transmitted signal including a speed limit value and a message code;

a memory for storing said speed limit value and having a table of stored messages;

a comparator for comparing said vehicle driving speed to said stored speed limit value and generating an alarm signal when said vehicle driving speed exceeds said stored speed limit value;

wherein said monitor device further decodes said message code and audibly plays one of said stored messages corresponding to the message code.

2. The vehicle driver monitor device according to claim 1, further comprising an interrupter for comparing a newly received speed limit value to said stored speed limit value, and replacing said stored speed limit value with said newly received speed limit value when said newly received speed limit value is different from said stored speed limit value.

3. The vehicle driver monitor device according to claim 1, further comprising storing means for storing speed violation data whenever said comparator generates said alarm signal.

4. The vehicle driver monitor device according to claim 1, further comprising storing means for storing speed violation data whenever said comparator determines that said vehicle driving speed exceeds said stored speed limit value by a predetermined amount.

5. The vehicle driver monitor device according to claim 1, further comprising a transmitter for transmitting a signal to be reflected from a coding device to thereby provide said transmitted signal including a speed limit value.

6. The vehicle driver monitor device according to claim 5, further comprising an interrupter for comparing a newly received speed limit value to said stored speed limit value, and replacing said stored speed limit value with said newly received speed limit value when said newly received speed limit value is different from said stored speed limit value.

7. The vehicle driver monitor device according to claim 6, further comprising storing means for storing speed violation data whenever said comparator determines that said vehicle driving speed exceeds said stored speed limit value by a predetermined amount.

8. The vehicle driver monitor device according to claim 7, further comprising an audible alarm means responsive to said alarm signal to provide an audible alarm, and wherein said alarm comprises a digitized voice message selectable from a plurality of different preprogrammed digitized voice messages.

9. The vehicle driver monitor device according to claim 8, wherein said coding device comprises a Universal Product Code.

10. A vehicle driver monitor device receiving a vehicle driving speed signal, comprising:

a receiver for receiving a transmitted signal including a speed limit value;

a memory for storing said speed limit value;

a comparator for comparing said vehicle driving speed to said stored speed limit value and generating an alarm signal when said vehicle driving speed exceeds said stored speed limit value; and a validating means for determining whether said speed limit value of said transmitted signal is valid.

11. The vehicle driver monitor device according to claim 10, further comprising an audible alarm means responsive to said alarm signal to provide an audible alarm.

12. The vehicle driver monitor device according to claim 11, wherein said audible alarm comprises a digitized voice message.

13. The vehicle driver monitor device according to claim 12, wherein said digitized voice message is selectable from a plurality of different pre-programmed digitized voice messages.

14. The vehicle driver monitor of claim 10, wherein said received transmitted signal further comprises a system identification string, and wherein said validating means further determines whether said system identification string is valid.

15. The vehicle driver monitor of claim 10, wherein said validating means further comprises a fault data counter that is incremented each time said validating means determines that said speed limit value is invalid and is reset whenever said validating means determines that said speed limit value is valid, and wherein when said false data counter reaches a predetermined terminal count value said driver monitor device issues a fault alarm.

16. A vehicle driver monitor device having a micro-controller and receiving a vehicle driving speed, comprising:

a receiver for receiving and decoding a transmitted signal including a speed limit value;

a memory for string current speed limit reference; an interrupter connected to said receiver and receiving said speed limit therefrom, said interrupter comparing said speed limit value to said current speed limit reference and interrupting said micro-controller when said encoded speed limit value differs from said current speed limit reference, for storing said encoded speed limit value in said memory as said current speed limit reference;

a comparator for comparing said received vehicle driving speed to said current speed limit reference and generating an alarm signal when said received vehicle driving speed exceeds said current speed limit reference;

wherein said transmitted signal further includes a system identification string and wherein said vehicle driver monitoring device further comprises:

a first validating means for ignoring said transmitted signal when said first validating means determines that said system identification string is invalid;

a second validating means for determining whether said speed limit value is valid.

17. The vehicle driver monitor device of claim 16, further comprising a false data counter responsive to said second validating means for incrementing whenever said second validating means determines that said speed limit value is invalid, and resetting whenever said second validating means determines that said speed limit value is valid, and wherein a fault alarm is generated when said false data counter reaches a predetermined terminal count value for enabling manual programming of said current speed limit reference.

18. A traffic monitoring system comprising the vehicle driver monitor device of claim 13 and further comprising a field transmitter for transmitting said transmitted signal.

19. A traffic monitoring system comprising a driver monitor device and a field transmitted for transmitting a signal, said transmitted signal comprises a speed limit value and a system identifier string, and wherein said driver monitor device comprises:

a receiver for receiving said transmitted signal including the speed limit value and system identifier string;

a memory for storing said speed limit value;

a comparator for comparing said vehicle driving speed to said stored speed limit value and generating an alarm signal when said vehicle driving speed exceeds said stored speed limit value; and a first validating means for ignoring said transmitted signal when said first validating means determines that said system identification string is invalid;

a second validating means for determining whether said speed limit value is valid.

20. The vehicle driver monitor control system according to claim 19, wherein said driver monitor device further comprises a false data counter responsive to said second validating means for incrementing whenever said second validating means determines that said speed limit value is invalid and resetting whenever said second validating means determines that said speed limit value is valid, and wherein a fault alarm is generated when said fault data counter reaches a predetermined terminal count value for enabling manual programming of said current speed limit reference.

* * * * *